United States Patent
McCann et al.

(10) Patent No.: US 9,094,819 B2
(45) Date of Patent: Jul. 28, 2015

(54) METHODS, SYSTEMS, AND COMPUTER READABLE MEDIA FOR OBSCURING DIAMETER NODE INFORMATION IN A COMMUNICATION NETWORK

(75) Inventors: Thomas M. McCann, Raleigh, NC (US); Peter J. Marsico, Chapel Hill, NC (US)

(73) Assignee: Tekelec, Inc., Morrisville, NC (US)

( * ) Notice: Subject to any disclaimer, the term of this patent is extended or adjusted under 35 U.S.C. 154(b) by 154 days.

(21) Appl. No.: 13/154,119

(22) Filed: Jun. 6, 2011

(65) Prior Publication Data

US 2011/0302244 A1     Dec. 8, 2011

Related U.S. Application Data

(60) Provisional application No. 61/351,923, filed on Jun. 6, 2010, provisional application No. 61/367,367, filed on Jul. 23, 2010.

(51) Int. Cl.
| | |
|---|---|
| *G06F 15/16* | (2006.01) |
| *H04L 12/28* | (2006.01) |
| *H04W 12/02* | (2009.01) |
| *H04L 29/06* | (2006.01) |
| *H04L 12/66* | (2006.01) |

(Continued)

(52) U.S. Cl.
CPC ........... *H04W 12/02* (2013.01); *H04L 63/0407* (2013.01); *H04L 12/2834* (2013.01); *H04L 12/66* (2013.01); *H04L 41/12* (2013.01); *H04L 2209/16* (2013.01); *H04W 4/02* (2013.01)

(58) Field of Classification Search
CPC ... H04W 12/02; H04L 12/2834; H04L 12/66; H04L 2209/16; H04L 41/12
USPC ............................ 709/204, 227, 230; 370/400
See application file for complete search history.

(56) References Cited

U.S. PATENT DOCUMENTS

| | | |
|---|---|---|
| 1,872,857 A | 4/1931 | Wesson et al. |
| 5,835,087 A | 11/1998 | Herz et al. |

(Continued)

FOREIGN PATENT DOCUMENTS

| | | |
|---|---|---|
| CN | 1964316 | 5/2007 |
| EP | 1 873 980 A1 | 1/2008 |

(Continued)

OTHER PUBLICATIONS

Calhoun et al., "RFC 3588—Diameter Base Protocol", Sep. 2003, Network Working Group, p. 1-148.*

(Continued)

*Primary Examiner* — Taylor Elfervig (74) *Attorney, Agent, or Firm* — Jenkins, Wilson, Taylor & Hunt, P.A.

(57) ABSTRACT

According to one aspect, the subject matter described herein includes a system for a system for obscuring DIAMETER node information in a communication network. The system includes a DIAMETER agent platform. The DIAMETER agent platform includes a network interface for receiving a message from a first DIAMETER node. The DIAMETER agent platform further includes a DIAMETER information hiding module for modifying, in the first message, DIAMETER information for the first DIAMETER node so as to obscure the identity of the first diameter node. The diameter agent includes a routing module for routing the modified message to a second DIAMETER node.

15 Claims, 8 Drawing Sheets

(51) Int. Cl.
*H04L 12/24* (2006.01)
*H04W 4/02* (2009.01)

(56) References Cited

U.S. PATENT DOCUMENTS

| | | | |
|---|---|---|---|
| 6,298,383 | B1 | 10/2001 | Gutman et al. |
| 8,171,032 | B2 | 5/2012 | Herz |
| 8,626,157 | B2 | 1/2014 | Nas et al. |
| 2003/0227894 | A1 | 12/2003 | Wang et al. |
| 2005/0235000 | A1 | 10/2005 | Keil |
| 2006/0078119 | A1 | 4/2006 | Jee et al. |
| 2006/0259759 | A1 | 11/2006 | Maino et al. |
| 2007/0297419 | A1 | 12/2007 | Askerup et al. |
| 2008/0010669 | A1 | 1/2008 | Aittola et al. |
| 2008/0039104 | A1 | 2/2008 | Gu et al. |
| 2009/0080440 | A1* | 3/2009 | Balyan et al. ............ 370/400 |
| 2009/0165017 | A1* | 6/2009 | Syed et al. ............... 719/311 |
| 2009/0232011 | A1 | 9/2009 | Li et al. |
| 2009/0265467 | A1 | 10/2009 | Peles |
| 2009/0305684 | A1 | 12/2009 | Jones et al. |
| 2009/0313379 | A1 | 12/2009 | Rydnell et al. |
| 2010/0291923 | A1 | 11/2010 | Zhou et al. |
| 2011/0165901 | A1 | 7/2011 | Baniel et al. |
| 2011/0195710 | A1 | 8/2011 | Nas et al. |
| 2012/0155389 | A1 | 6/2012 | McNamee et al. |
| 2012/0157047 | A1 | 6/2012 | Chen et al. |
| 2012/0158994 | A1 | 6/2012 | McNamee et al. |
| 2012/0226814 | A1* | 9/2012 | Stucker ................... 709/227 |
| 2013/0151845 | A1 | 6/2013 | Donovan |

FOREIGN PATENT DOCUMENTS

| | | | |
|---|---|---|---|
| EP | 1 357 720 | A1 | 10/2010 |
| EP | 2 242 205 | A1 | 10/2010 |
| EP | 2 220 841 | B1 | 9/2011 |
| WO | WO 2011/082090 | A2 | 7/2011 |
| WO | WO 2011/100166 | A2 | 8/2011 |

OTHER PUBLICATIONS

M. Rouse, "Platform", Sep. 2006, Internet: searchservervirtualization.techtarget.com/definition/platform, p. 1-2.*

Farago, A.; Chlamtac, I.; Basagni, S., "Virtual path network topology optimization using random graphs," INFOCOM '99. Eighteenth Annual Joint Conference of the IEEE Computer and Communications Societies. Proceedings. IEEE , vol. 2, No., pp. 491,496 vol. 2, Mar. 21-25, 1999.*

David M. Goldschlag, Michael G. Reed, Paul F. Syverson, "Hiding Routing Information", 1996, Springer Berlin Heidelberg, First International Workshop Cambridge, U.K., May 30-Jun. 1, 1996 Proceedings, Information Hiding Lecture Notes in Computer Science vol. 1174, 1996, pp. 137-150.*

Notification of Transmital of the International Search Report and the Written Opinion of the International Searching Authority, or the Declaration for International Patent Application No. PCT/US2012/027281 (Jun. 15, 2012).

Notification of Transmittal of the International Search Report and the Written Opinion of the International Searching Authority, or the Declaration for International Application No. PCT/US2012/027263 (Jun. 14, 2012).

Notification of Transmittal of the International Search Report and the Written Opinion of the International Searching Authority, or the Declaration for International Patent Application No. PCT/US2012/027736 (Jun. 12, 2012).

Notification of Transmittal of the International Search Report and the Written Opinion of the International Searching Authority, or the Declaration for International Patent Application No. PCT/US2012/023971 (Jun. 11, 2012).

Notification of Transmittal of the International Search Report and the Written Opinion of the International Searching Authority, or the Declaration for International Patent Application No. PCT/US2012/027269 (Jun. 11, 2012).

Commonly-assigned, co-pending International Application No. PCT/US12/27736 for "Methods, Systems, and Computer Readable Media for Enriching a Diameter Signaling Message," (Unpublished, filed Mar. 5, 2012).

Commonly-assigned, co-pending U.S. Appl. No. 13/412,352 titled "Methods, Systems, and Computer Readable Media for Enriching a Diameter Signaling Message," (Unpublished, filed Mar. 5, 2012).

Commonly-assigned, co-pending International Application No. PCT/US12/27281 for "Methods, Systems, and Computer Readable Media for Hybrid Session Based Diameter Routing," (Unpublished, filed Mar. 1, 2012).

Commonly-assigned, co-pending U.S. Appl. No. 13/409,949 titled "Methods, Systems, and Computer Readable Media for Hybrid Session Based Diameter Routing," (Unpublished, filed Mar. 1, 2012).

Commonly-assigned, co-pending International Application No. PCT/US12/27269 for "Methods, Systems, and Computer Readable Media for Dynamically Learning Diameter Binding Information," (Unpublished, filed Mar. 1, 2012).

Commonly-assigned, co-pending U.S. Appl. No. 13/409,914 titled "Methods, Systems, and Computer Readable Media for Dynamically Learning Diameter Binding Information," (Unpublished, filed Mar. 1, 2012).

Commonly-assigned, co-pending International Application No. PCT/US12/27263 for "Methods, Systems, and Computer Readable Media for Sharing Diameter Binding Data," (Unpublished, filed Mar. 1, 2012).

Commonly-assigned, co-pending U.S. Appl. No. 13/409,893 for "Methods, Systems, and Computer Readable Media for Sharing Diameter Binding Data," (Unpublished, filed Mar. 1, 2012).

Notification of Transmittal of the International Search Report and the Written Opinion of the International Searching Authority, or the Declaration for International Application No. PCT/US2011/039285 (Feb. 9, 2012).

Commonly-assigned, co-pending International Application No. PCT/US12/23971 for "Methods, Systems, and Computer Readable Media for Provisioning a Diameter Binding Repository", (Unpublished, filed Feb. 6, 2012).

Commonly-assigned, co-pending U.S. Appl. No. 13/366,928 titled "Methods, Systems, and Computer Readable Media for Provisioning a Diameter Binding Repository", (Unpublished, filed Feb. 6, 2012).

Notification of the Transmittal of the International Search Report and the Written Opinion of the International Searching Authority, or the Declaration for International Application No. PCT/US2010/061934 (Oct. 25, 2011).

3GPP, "3rd Generation Partnership Project; Technical Specification Group Services and System Aspects; Policy and Charging Control Architecture (Release 11)," 3GPP TS 23.203 V11.0.1, pp. 1-137 (Jan. 2011).

"Digital cellular telecommunications system (Phase 2+); Universal Mobile Telecommunications System (UMTS); LTE; IP Multimedia Subsystem (IMS); Stage 2 (3GPP TS 23.228 version 9.4.0 Release 9)," ETSI TS 123 228, V9.4.0 (Oct. 2010).

"Digital cellular telecommunications system (Phase 2+); Universal Mobile Telecommunications System (UMTS); LTE; End-to-end Quality of Service (QoS) concept and architecture (3GPP TS 23.207 version 9.0.0 Release 9)," ETSI TS 123 207, V9.0.0 (Oct. 2010).

"3rd Generation Partnership Project; Technical Specification Group Services and System Aspects; Telecommunication management; Charging management; Packet Switcher (PS) domain charging (Release 9)," 3GPP TS 32.251, V9.4.0 (Oct. 2010).

"3rd Generation Partnership Project; Technical Specification Group Services and System Aspects; Telecommunication management; Charging management; Diameter charging applications (Release 9)," 3GPP TS 32.299, V9.4.0 (Jun. 2010).

"3rd Generation Partnership Project; Technical Specification Group Services and System Aspects; Telecommunication management; Charging management; Charging architecture and principles (Release 9)," 3GPP TS 32.240, V9.1.0 (Jun. 2010).

Znaty, "Diameter, GPRS, (LTE + ePC = EPS), IMS, PCC and SDM," EFORT, pp. 1-229 (Part 1 of 2) (May 2010).

Znaty, "Diameter, GPRS, (LTE + ePC = EPS), IMS, PCC and SDM," EFORT, pp. 230-461 (Part 2 of 2) (May 2010).

(56) References Cited

OTHER PUBLICATIONS

3GPP, "3rd Generation Partnership Project; Technical Specification Group Core Network and Terminals; Policy and Charging Control signalling flows and Quality of Service (QoS) parameter mapping (Release 9)," 3rd Generation Partnership Project, TS 29.213 V9.2.0, pp. 1-129 (Mar. 2010).

"3rd Generation Partnership Project; Technical Specification Group Core Network and Terminals; Policy and Charging Control over Gx reference point (Release 9)," 3GPP TS 29.212 V9.2.0 (Mar. 2010).

Hakala et al., "Diameter Credit-Control Application," RFC 4006, pp. 1-114 (Aug. 2005)

Calhoun et al., "Diameter Network Access Server Application," RFC 4005, pp. 1-85 (Aug. 2005).

Calhoun et al., "Diameter Mobile IPv4 Application," RFC 4004, pp. 1-53 (Aug. 2005).

"IMS Security Framework," 3GPP2 S.R0086-0, Version 1.0, pp. 1-39 (Dec. 11, 2003).

"IP Multimedia Subsystem—Accounting Information Flows and Protocol," 3GPP2 X.S0013-008-0, Version 1.0, pp. 1-42 (Dec. 2003).

"IP Multimedia Subsystem—Charging Architecture," 3GPP2 X.S0013-007-0, Version 1.0, pp. 1-16 (Dec. 2003).

Olson et al., "Support for IPv6 in Session Description Protocol (SDP)," RFC 3266, pp. 1-5 (Jun. 2002).

"3rd Generation Partnership Project; Technical Specification Group Core Network and Terminals; Evolved Packet System (EPS); Mobility Management Entity (MME) and Serving GPRS Support Node (SGSN) related interfaces based on Diameter protocol (Release 10)," 3GPP TS 29.272, V10.2.0, pp. 1-95 (Mar. 2011).

Calhoun et al., "Diameter Base Protocol," RFC 3588, pp. 1-147 (Sep. 2003).

Non-Final Office Action for U.S. Appl. No. 13/021,402 (Nov. 8, 2012).

Notification of Transmittal of the International Search Report and the Written Opinion of the International Searching Authority, or the Declaration for International Application No. PCT/US2011/023752 (Oct. 26, 2011).

3GPP, "3rd Generation Partnership Project; Technical Specification Group Core Network and Terminals; InterWorking Function (IWF) Between MAP Based and Diameter Based Interfaces (Release 9)," 3GPP TS 29.305 V9.0.0, pp. 1-63 (Dec. 2009).

Communication of European publication number and information on the application of Article 67(3) EPC for European Patent Application No. 11792956.2 (Mar. 13, 2013).

Calhoun et al., "Diameter Base Protocol,"draft-ietf-aaa-diameter-07, Section 6.3, p. 68 (Jul. 2001).

Notice of Allowance and Fee(s) Due for U.S. Appl. No. 13/021,402 (Sep. 9, 2013).

Email Regarding Decision to Grant for Korean Patent Application No. 2012-7034449 (Mar. 2, 2015).

Office Action for Korean Patent Application No. 2012-7034449 (Oct. 14, 2014).

Notification of the First Office Action for Chinese Patent Application No. 201180032307.4 (Nov. 4, 2014).

Final Office Action for U.S. Appl. No. 13/712,481 (Dec. 3, 2014).

Non-Final Office Action for U.S. Appl. No. 13/712,481 (May 8, 2014).

Notice of Preliminary Rejection for Korean Patent Application No. 2012-7034449 (Apr. 25, 2014).

\* cited by examiner

Stateful MME Hiding Data

| Subscriber ID | Session ID | DIAMETER Host | DIAMETER Realm | Virtual Host Token |
|---|---|---|---|---|
| IMSI1 | session1 | MME1 | SPRINT.NET | MME-Public |

Figure 8A

Stateless HSS Hiding Data

| Subscriber ID | DIAMETER Host | DIAMETER Realm | Virtual Host Token |
|---|---|---|---|
| IMSI1 | HSS1 | VZW.NET | HSS-Public |

Figure 8B

METHODS, SYSTEMS, AND COMPUTER READABLE MEDIA FOR OBSCURING DIAMETER NODE INFORMATION IN A COMMUNICATION NETWORK

PRIORITY CLAIM

This application claims the benefit of U.S. Provisional Patent Application Ser. No. 61/351,923 filed Jun. 6, 2010 and U.S. Provisional Patent Application Ser. No. 61/367,367 filed Jul. 23, 2010; the disclosures of which are incorporated herein by reference in their entireties.

TECHNICAL FIELD

The subject matter described herein relates to methods and systems for communications in a DIAMETER network. More particularly, the subject matter described herein relates to methods, systems, and computer readable media for obscuring DIAMETER node information in a communication network.

BACKGROUND

In DIAMETER networks, messages and communications between nodes in the network include information identifying the name and location of each node in the network. For example, when a request message is sent to a realm or domain in the network and is routed to the appropriate server, the request message and server's response each include information identifying the client and server, respectively, to each other.

DIAMETER messages exist in the format of request-answer messages. All answer messages travel back to the request source via the same path through which the request message was routed using hop-by-hop transport. When one DIAMETER node needs information from another DIAMETER node, the first DIAMETER node sends a request identifying itself and its realm or domain, as well as identifying the realm or domain of the DIAMETER node from which the first DIAMETER node needs information. The DIAMETER answer message sent back from the DIAMETER node that receives the request will include information identifying the receiving DIAMETER node and its realm or domain.

There are disadvantages associated with providing a requesting node with DIAMETER node identification and location information. This type of information is generically referred to herein as DIAMETER node information. Providing DIAMETER node information to untrusted parties could pose a security risk. By providing an outside node with a DIAMETER node's address, the providing DIAMETER node becomes more susceptible to attacks. Also, it might be desirable for a service provider to withhold information about its network topology, such as the number of home subscriber servers (HSSs) in the network, from its competitors, as an example.

Accordingly, in light of these disadvantages associated with the inclusion of identifying information in DIAMETER messages, there exists a need for methods, systems, and computer readable media for obscuring DIAMETER node information in a communications network.

SUMMARY

According to one aspect, the subject matter described herein includes a system for obscuring DIAMETER node information in a communication network. The system includes a DIAMETER agent platform. The DIAMETER agent platform includes a network interface for receiving a message from a first DIAMETER node. The DIAMETER agent platform further includes a DIAMETER information hiding module for modifying, in the first message, DIAMETER information for the first DIAMETER node so as to obscure the identity of the first diameter node. The diameter agent includes a routing module for routing the modified message to a second DIAMETER node.

According to another aspect, the subject matter described herein includes a method for obscuring DIAMETER node information in a communication network. The method includes receiving, at a DIAMETER agent platform, a message from a first DIAMETER node. The method further includes modifying DIAMETER information in the message received from the first DIAMETER node so as to obscure the identity of the first DIAMETER node. The method further includes routing the modified message to a second DIAMETER node.

The subject matter described herein for obscuring DIAMETER node information in a communication network may be implemented in hardware, a combination of hardware and software, firmware, or any combination of hardware, software, and firmware. As such, the terms "function" or "module" as used herein refer to hardware, a combination of hardware and software, firmware, or any combination of hardware, software, and firmware for implementing the features described herein. In one exemplary implementation, the subject matter described herein may be implemented using a computer readable medium having stored thereon computer executable instructions that when executed by the processor of a computer control the computer to perform steps. Exemplary computer readable media suitable for implementing the subject matter described herein include non-transitory devices, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

Preferred embodiments of the subject matter described herein will now be explained with reference to the accompanying drawings, wherein like reference numerals represent like parts, of which.

DETAILED DESCRIPTION

In accordance with the subject matter disclosed herein, methods, systems, and computer readable media are provided for obscuring DIAMETER node information in a communication network. Reference will now be made in detail to exemplary embodiments of the subject matter described herein, examples of which are illustrated in the accompanying drawings. Wherever possible, the same reference numbers will be used throughout the drawings to refer to the same or like parts.

Figure 1:
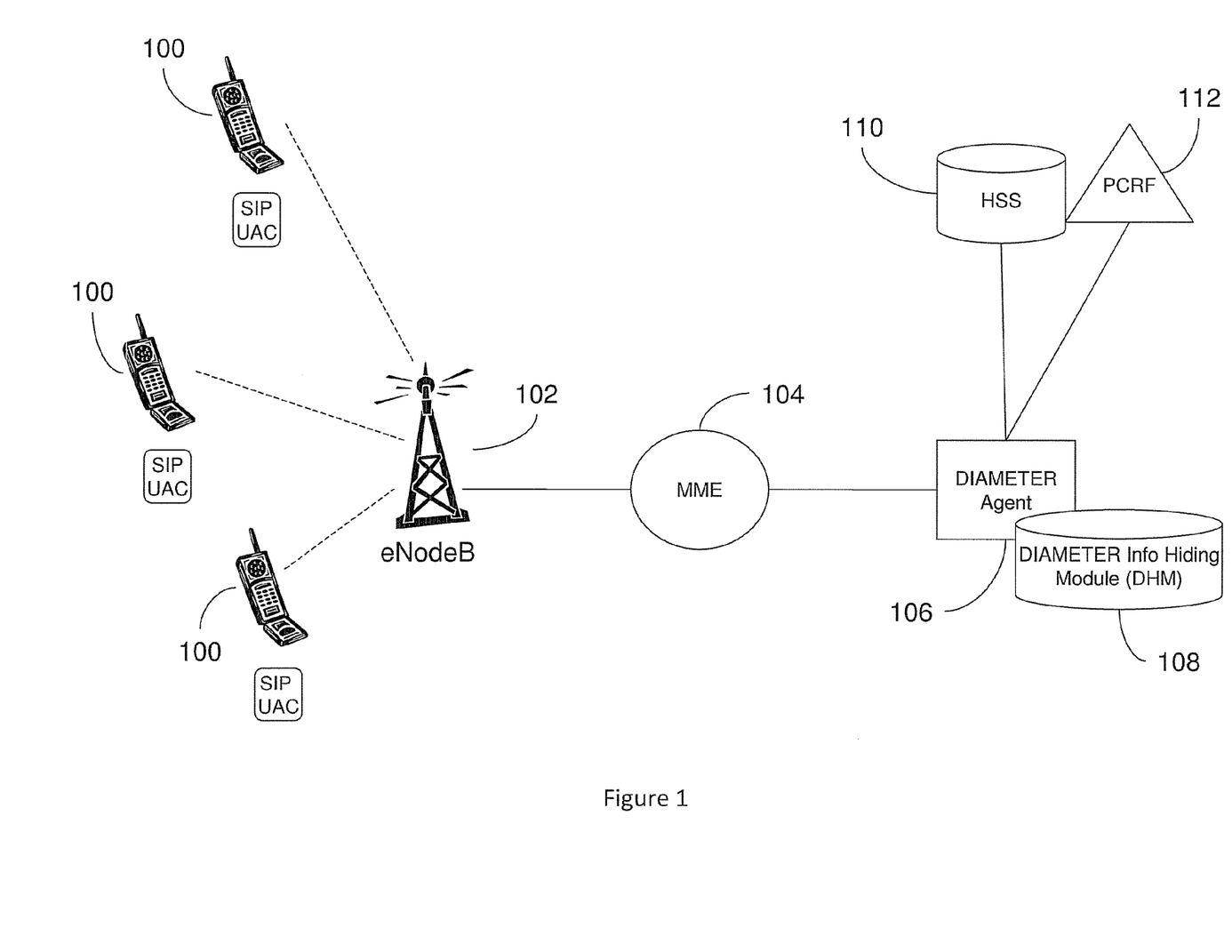
FIG. 1 is a block diagram illustrating an exemplary LTE network including the present invention according to an embodiment of the subject matter described herein.

FIG. 1 is a block diagram illustrating an exemplary LTE network including a DIAMETER agent according to an embodiment of the subject matter described herein. In FIG. 1, end user devices 100 (e.g., mobile handsets) are connected to eNodeB 102A, which performs radio access functions similar to a base transceiver station (BTS). A mobility management entity (MME) 104 performs authentication and tracking of end user devices 100. MME 104 is connected to DIAMETER agent 106, which includes a DIAMETER information hiding module (DHM) 108 for implementing a diameter information hiding function. As will be described in more detail below, DIAMETER information hiding module 108 strips DIAMETER identification information from received messages so that the secrecy of DIAMETER topology and node identification information is preserved. DIAMETER agent 106 is further connected to network nodes, such as home subscriber server (HSS) 110 and policy and charging rules function (PCRF) 112. HSS 110 stores mobile subscription data. PCRF 112 provides policy and charging control functions. DIAMETER agent 106 may additionally be connected to other network nodes, such as online and offline charging systems, to provide additional functions and services to network subscribers.

Figure 2:
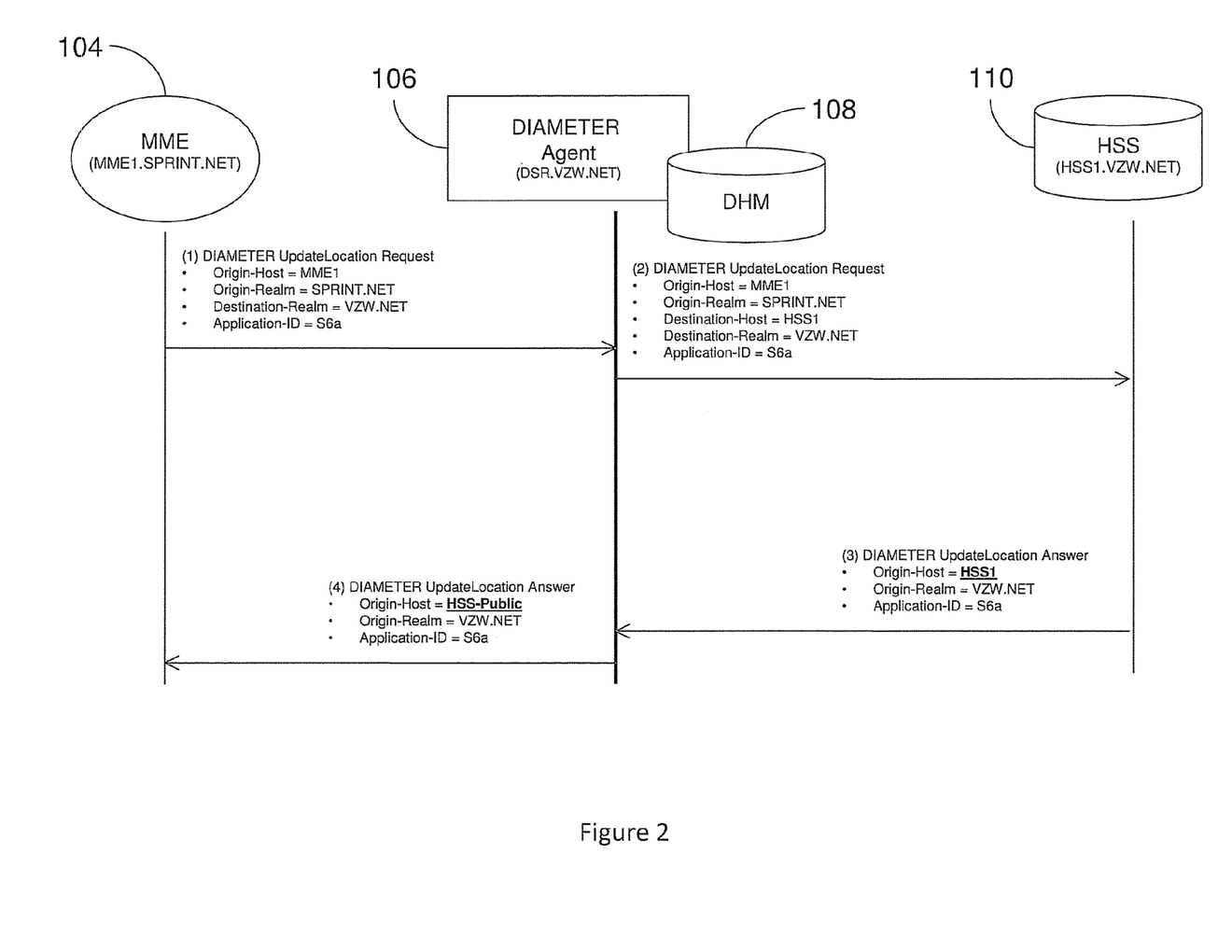
FIG. 2 is a signaling message flow diagram illustrating exemplary messages communicated between an MME and an HSS through a DIAMETER agent according to an embodiment of the subject matter described herein.

FIG. 2 is a signaling message flow diagram illustrating exemplary messages communicated between an MME and an HSS through a DIAMETER agent according to an embodiment of the subject matter described herein. In the illustrated example, MME 104 on Sprint's network needs information from HSS 110 on Verizon's network, for a Verizon customer who is roaming on Sprint's network. Sprint's MME 104 does not know the specific host information for Verizon's HSS 110, just that the subscriber who is roaming is a Verizon customer. In step (1), MME 104 sends a DIAMETER UpdateLocation Request (ULR) message directed to Verizon's domain or realm, i.e. "Destination-Realm=VZW.NET". The ULR message includes DIAMETER identifying information, i.e. "Origin-Host=MME1" and "Origin-Realm=SPRINT.NET". The ULR message may also include the subscriber's International Mobile Subscriber Identity (IMSI) and an application ID.

The ULR message is received by Verizon's DIAMETER agent 106, which includes DIAMETER information hiding module 108. DIAMETER agent 106 evaluates the message, determines which Verizon HSS 110 serves this subscriber, and, in step (2), routes the message to the appropriate Verizon HSS 110. In addition, DIAMETER agent 106 may change the routing information to include information identifying the specific target host, i.e. "Destination-Host=HSS1". Furthermore, DIAMETER agent 106 may maintain state information about the message, as will be described in greater detail below, regarding FIG. 8A. Next, HSS 110 retrieves the requested subscriber information and in step (3) sends a DIAMETER UpdateLocation Answer (ULA) message, directed to MME 104, back to DIAMETER agent 106, following a hop-by-hop transport protocol. The ULA message includes DIAMETER identifying information identifying HSS 110 as the source host, i.e. "Origin-Host=HSS1" and "Origin-Realm=VZW.NET".

At this juncture, DIAMETER agent 106, in order to withhold specific host information from Sprint's MME 104, uses DHM 108 to obscure the identity of the source host by modifying the origin host identifying information to indicate the message originated from a virtual host, i.e. "Origin-Host=HSS-Public". Alternatively, DIAMETER agent 106 may replace the actual source host identifying information with information identifying itself as the origin source, i.e. "Origin-Host=DSR" (where "DSR" is an identity that DIAMETER agent 106 recognizes as its own). Additionally, DIAMETER agent 106 may maintain information regarding the virtual host identity used for this message from HSS 110, as is discussed in greater detail below, regarding FIG. 8B. At step (4), DIAMETER agent 106 sends the modified ULA message to MME 104.

DIAMETER agent 106 may use a single virtual identity for all the network elements it is protecting, e.g. "HSS-Public" as the virtual host identity for all HSSs in the network, or assign a virtual host identity to smaller groups of network nodes. Alternatively, DIAMETER agent 106 may use a different virtual host for each host node in its network, for example, if the goal was simply to mask the identities of network nodes but not to hide the number of network elements currently deployed. In another alternative embodiment, DIAMETER agent 106 may associate multiple virtual host names with a single host node, to further obscure the network's topology by making it appear as though there are more network nodes than the network actually has. DIAMETER agent 106 may also change the virtual host name for any or all network nodes periodically, such as once per day, for example, or at non-regular intervals, for example, in response to some event.

Additional messages involving this subscriber may be identified by the subscriber's IMSI and may be directed to this virtual host address, i.e., "Destination-Host=HSS-Public". Any such messages would be received by DIAMETER agent 106, which is then responsible for resolving the actual host's identity and may use DHM 108 to modify the message accordingly, i.e. to update DIAMETER identification information to identify "Destination-Host=HSS1". DIAMETER agent 106 then routes the message to HSS 110. DIAMETER agent 106 is responsible for maintaining sufficient mapping information to correctly associate an obscured destination host identity, e.g. "HSS-Public", and the actual host identity, e.g. "HSS1", such that any subsequent messages involving the subscriber are properly routed to the same host each time. Additional answer messages sent from HSS 110 in response will also be routed through DIAMETER agent 106, where again any DIAMETER identifying information would be modified to hide the identity of the node from which the answer originates.

Figure 3:
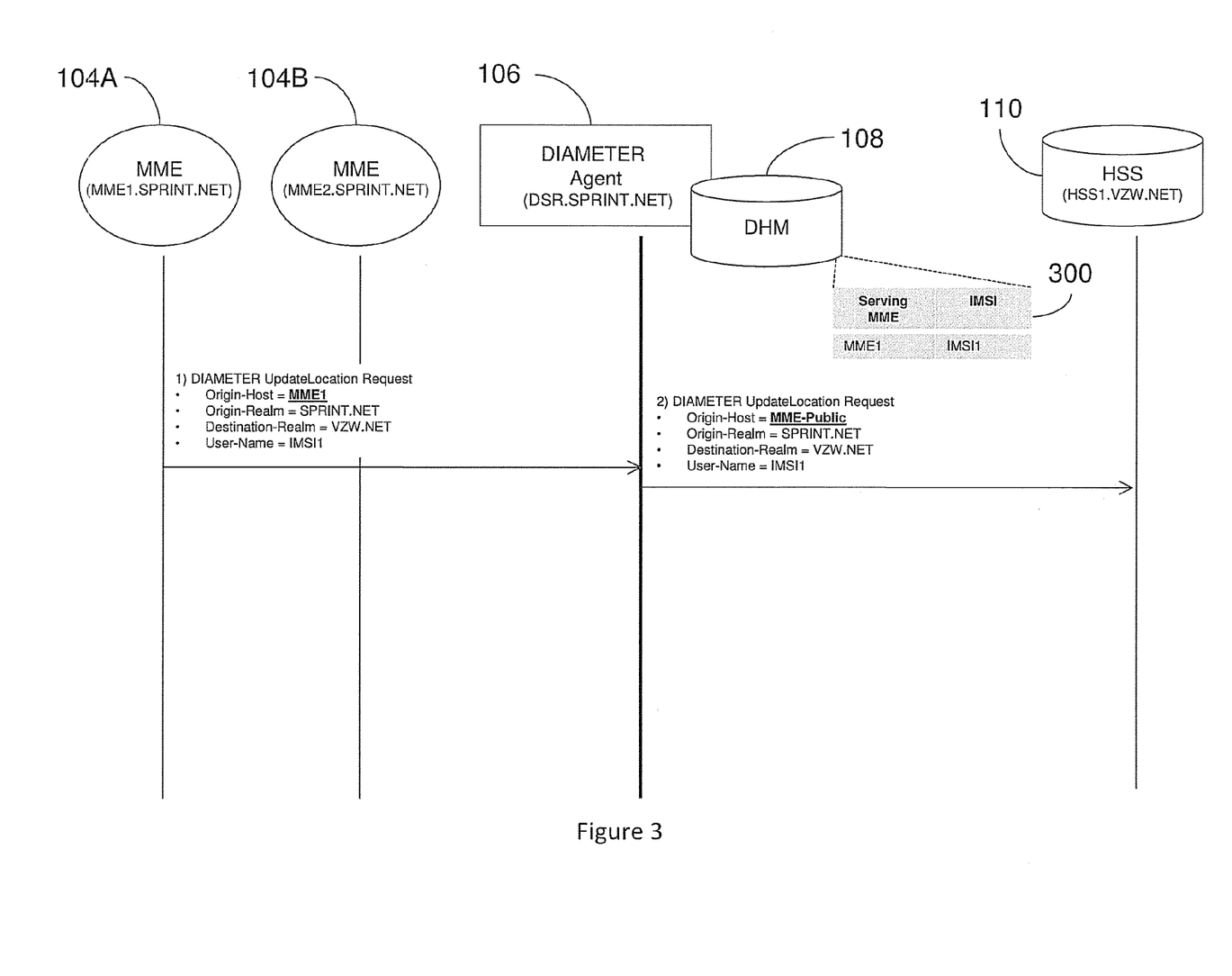
FIG. 3 is a signaling message flow diagram illustrating exemplary messages communicated between an MME and an HSS through a DIAMETER agent according to an embodiment of the subject matter described herein.

FIG. 3 is a signaling message flow diagram illustrating exemplary messages communicated between an MME and an HSS through a DIAMETER agent according to an embodiment of the subject matter described herein. In the illustrated example, Sprint's objective is to mask the identity of a DIAMETER host serving a subscriber, or to conceal the number of network elements currently deployed, in order to obscure its network topology, much like Verizon, as discussed above. In this example, Sprint wants to hide the identities of its MMEs and keep Verizon from knowing how many MMEs Sprint has deployed. As described above, MME 104A on Sprint's network needs information from HSS 110 on Verizon's network, for a Verizon customer who is roaming on Sprint's network. Sprint's MME 104A does not know the specific host information for Verizon's HSS 110, just that the subscriber who is roaming is a Verizon customer. Therefore, in step (1), MME 104A sends a DIAMETER UpdateLocation Request (ULR) message directed to Verizon's domain or realm, i.e. "Destination-Realm=VZW.NET". The ULR message includes DIAMETER identifying information, i.e. "Origin-Host=MME1" and "Origin-Realm=SPRINT.NET". The ULR message may also include the subscriber's International Mobile Subscriber Identity (IMSI) and an application ID.

Prior to reaching Verizon's network, the ULR message is intercepted by Sprint's DIAMETER agent 106, which includes DIAMETER information hiding module 108. DIAMETER agent 106 is tasked with obscuring Sprint's network topology, and thus uses DHM 108 to obscure the identity of the source host by modifying the origin host identifying information to indicate the message originated from a virtual host, i.e. "Origin-Host=MME-Public". Notably, in the illustrated example, a ULR message originating from MME 104B (not shown) would likewise be modified to indicate the message originated from a virtual host, i.e. "Origin-Host=MME-Public". By identifying a single virtual host as the origin host of all messages from any of Sprint's MMEs in this manner, DIAMETER agent 106 effectively conceals the topology of Sprint's network, making it appear to outside network nodes as though Sprint only has a single deployed MME.

In this example, DIAMETER agent 106 maintains state information regarding the virtual host identity used for this message. DIAMETER agent 106 may store this information in a database or table such as mapping table 300. Mapping table 300 identifies the actual MME serving the subscriber, i.e. associates MME 104A with "IMSI1". Stateful and stateless implementations of the subject matter disclosed herein are discussed in greater detail below, regarding FIG. 8B. At step (2), DIAMETER agent 106 sends the modified ULR message to Verizon's realm, where it is then routed to HSS 110. Additionally, HSS 110 would then retrieve the requested information regarding the subscriber whose IMSI was identified in the ULR message, formulate a ULA message including the retrieved information, and send the ULA back to MME 104A via hop-by-hop transport protocol (not shown).

Figure 4:
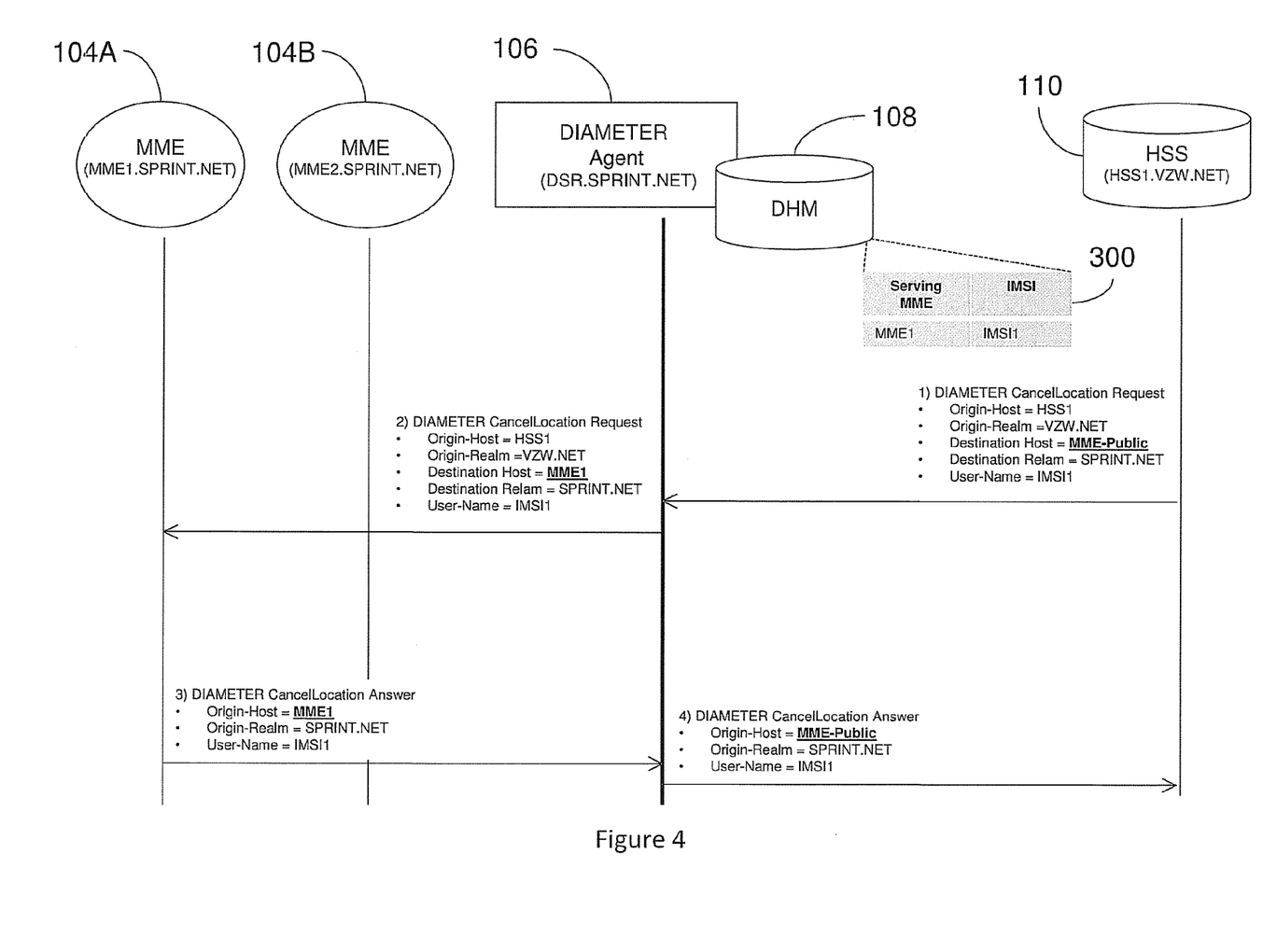
FIG. 4 is a signaling message flow diagram illustrating exemplary messages communicated between an HSS and an MME through a DIAMETER agent according to an embodiment of the subject matter described herein.

FIG. 4 is a signaling message flow diagram illustrating exemplary messages communicated between an HSS and an MME through a DIAMETER agent according to an embodiment of the subject matter described herein. The example illustrated in FIG. 4 may be considered an extension of the example illustrated in FIG. 3, where the messages of FIG. 4 subsequently follow the messages illustrated in FIG. 3 and some later time within the same session or series of messages involving the subscriber identified by IMSI1. However, it is notable that the messages of FIG. 4 are not responses to the messages in FIG. 3, but rather a distinct, independent set of DIAMETER Requests and Answers.

Continuing with the example set forth in FIG. 3 above, after an initial connection has been established (via the described ULR and ULA messages), a plethora of DIAMETER messages may be communicated back and forth between MME 104A, masked as "MME-Public", and HSS 110, and may be originated by either MME 104A or HSS 110, depending on the DIAMETER message type. FIG. 4 illustrates exemplary request messages originated by HSS 110, such as a DIAMETER CancelLocation Request (CLR). Notably, HSS 110 is only aware of the identity of Sprint's virtual host, "MME-Public". Thus, in step (1), HSS 110 creates a CLR message including DIAMETER identifying information for the message source, i.e. "Origin-Host=HSS1" and "Origin-Realm=VZW.NET", as well as the message destination, i.e. "Destination-Host=MME-Public" and "Destination-Realm=SPRINT.NET", and the subscriber, i.e. "User-Name=IMSI1". HSS 110 then routes this CLR message to Sprint's network, where it is intercepted and processed by DIAMETER agent 106. DIAMETER agent 106 evaluates the message and may access stored mapping or state information to determine which MME is serving the identified subscriber. Once MME 104A is identified as the actual destination host, in step (2) DIAMETER agent 106 modifies the intercepted CLR message to include "Destination-Host=MME1" and routes the CLR message to MME 104A. In step (3), MME 104A generates a corresponding DIAMETER CancelLocation Answer (CLA) including DIAMETER identifying information, i.e. "Origin-Host=MME1" which it sends back to HSS 110, following a hop-by-hop transport protocol. In step (4), DIAMETER agent 106 intercepts the CLA message which includes the identity of MME1 and modifies the CLA message to identify "Origin-Host=MME-Public", like all previous messages in this session or in this series of DIAMETER messages associated with this subscriber and sent between MME 104A and HSS 110.

Figure 5:
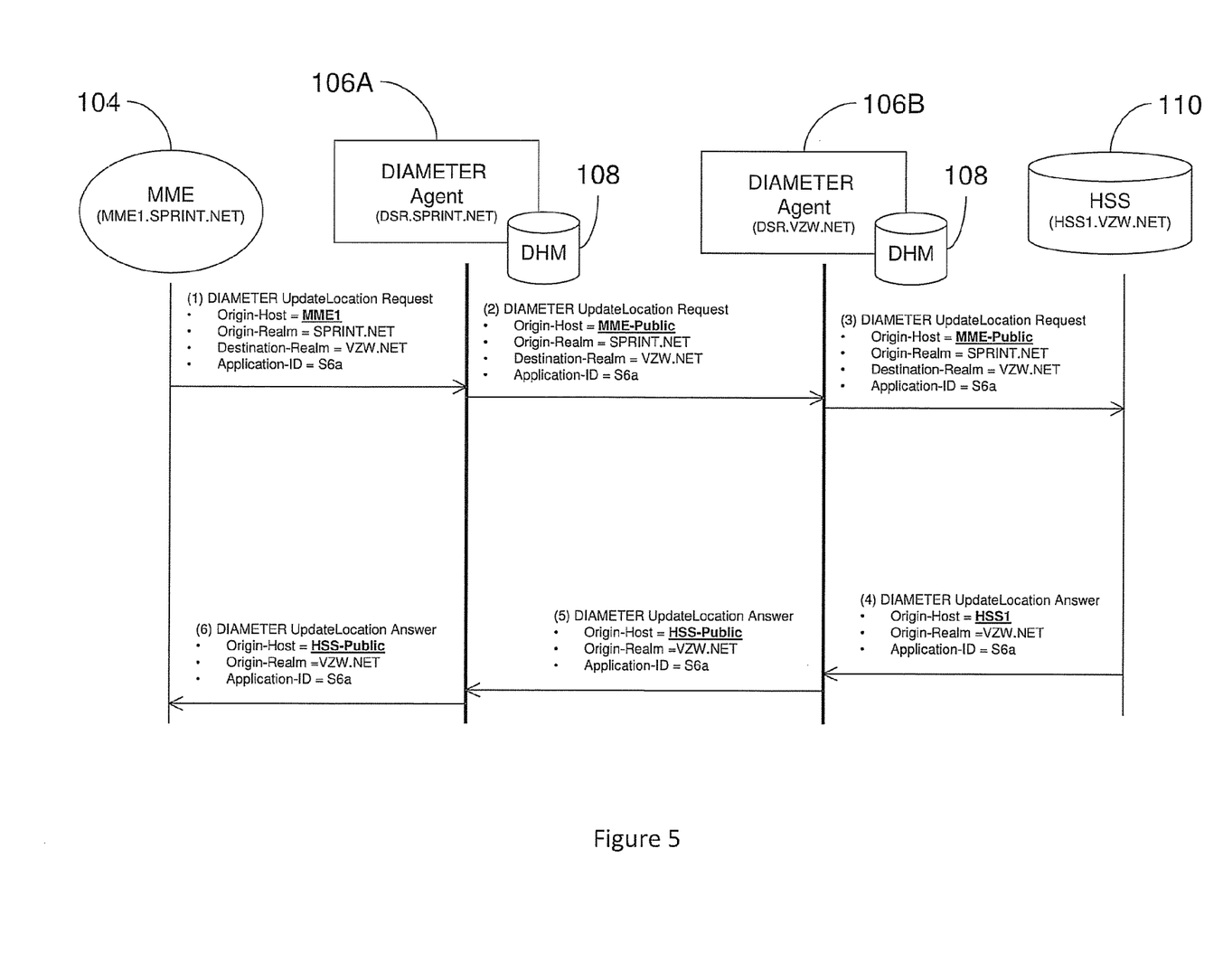
FIG. 5 is a signaling message flow diagram illustrating exemplary messages communicated between an MME and an HSS through two DIAMETER agents according to an embodiment of the subject matter described herein.

FIG. 5 is a signaling message flow diagram illustrating exemplary messages communicated between an MME and an HSS through multiple DIAMETER agents according to an embodiment of the subject matter described herein. In this embodiment, both Verizon and Sprint intend to hide their respective network topologies from the other party. As described above, MME 104 in Sprint's network needs information from HSS 110 in Verizon's network for a Verizon customer who is roaming in Sprint's network. Sprint's MME 104 does not know the specific host information for Verizon's HSS 110, just that the person roaming is a Verizon customer. In step (1), MME 104 sends a ULR message directed to Verizon's domain or realm, i.e., "Destination-Realm=VZW.NET". The ULR message includes DIAMETER identifying information, i.e., "Origin-Host=MME1" and "Origin-Realm=SPRINT.NET". The ULR message may also include the subscriber's IMSI.

DIAMETER agent 106A, including DIAMETER information hiding module 108 and belonging to Sprint, intercepts this ULR message. In order to withhold specific information about the Sprint network topology, DIAMETER agent 106A modifies the message, using DHM 108, to hide the identity of the Sprint node requesting information, and may replace that identification information with virtual host information, i.e. "Origin-Host=MME-Public". Then, in step (2), DIAMETER agent 106A routes the ULR message to Verizon's domain. DIAMETER agent 106A may also store state information about the message prior to sending the message to Verizon, such as information identifying MME 104 as the MME currently serving the subscriber associated with "IMSI1".

The ULR message is received by Verizon's DIAMETER agent 106B, including topology hiding module 108. DIAM- ETER agent 106B evaluates the message and, at step (3), routes the message to the appropriate Verizon HSS 110. DIAMETER agent 106B may also maintain state information about the message. HSS 110 retrieves the desired information and at step (4) generates and sends a ULA message, directed to MME 104, back to DIAMETER agent 106B, following hop-by-hop transport protocol. This ULA message includes DIAMETER identifying information, i.e. "Origin-Host=HSS1" and "Origin-Realm=VZW.NET".

DIAMETER agent 106B using DHM 108, in order to withhold specific host information from Sprint, replaces this information with virtual host information, i.e. "Origin-Host=HSS-Public". DIAMETER agent 106B may maintain information identifying "HSS-Public" as the virtual host name associated with HSS 110. In step (5), DIAMETER agent 106B sends the modified ULA message to DIAMETER agent 106A, following hop-by-hop transport protocol.

DIAMETER agent 106A receives the ULA message and may use stored state information to determine which node on its network this ULA is actually addressed to, i.e., MME 104. For example, DIAMETER agent 106B may store a transaction identifier from the outgoing ULR message and may use that transaction identifier to locate the corresponding response message. In an alternate implementation, DIAMETER agent 106B and in particular, DIAMETER information hiding module 108, may be stateless with regard to the transaction involving the received message from which topology information is extracted or hidden. In a stateless implementation, the DIAMETER information hiding module 108 may maintain a mapping between the virtual identifier placed in the ULA message and the DIAMETER topology information that was removed or obscured. This mapping may also include the subscriber's IMSI. When a subsequent message relating to a same transaction is received and is addressed to the virtual identifier, topology hiding module may use the stored mapping information when replacing the virtual identifier with the real DIAMETER identifier for the destination. In step (6), DIAMETER agent 106B sends the ULA to MME 104.

Figure 6:
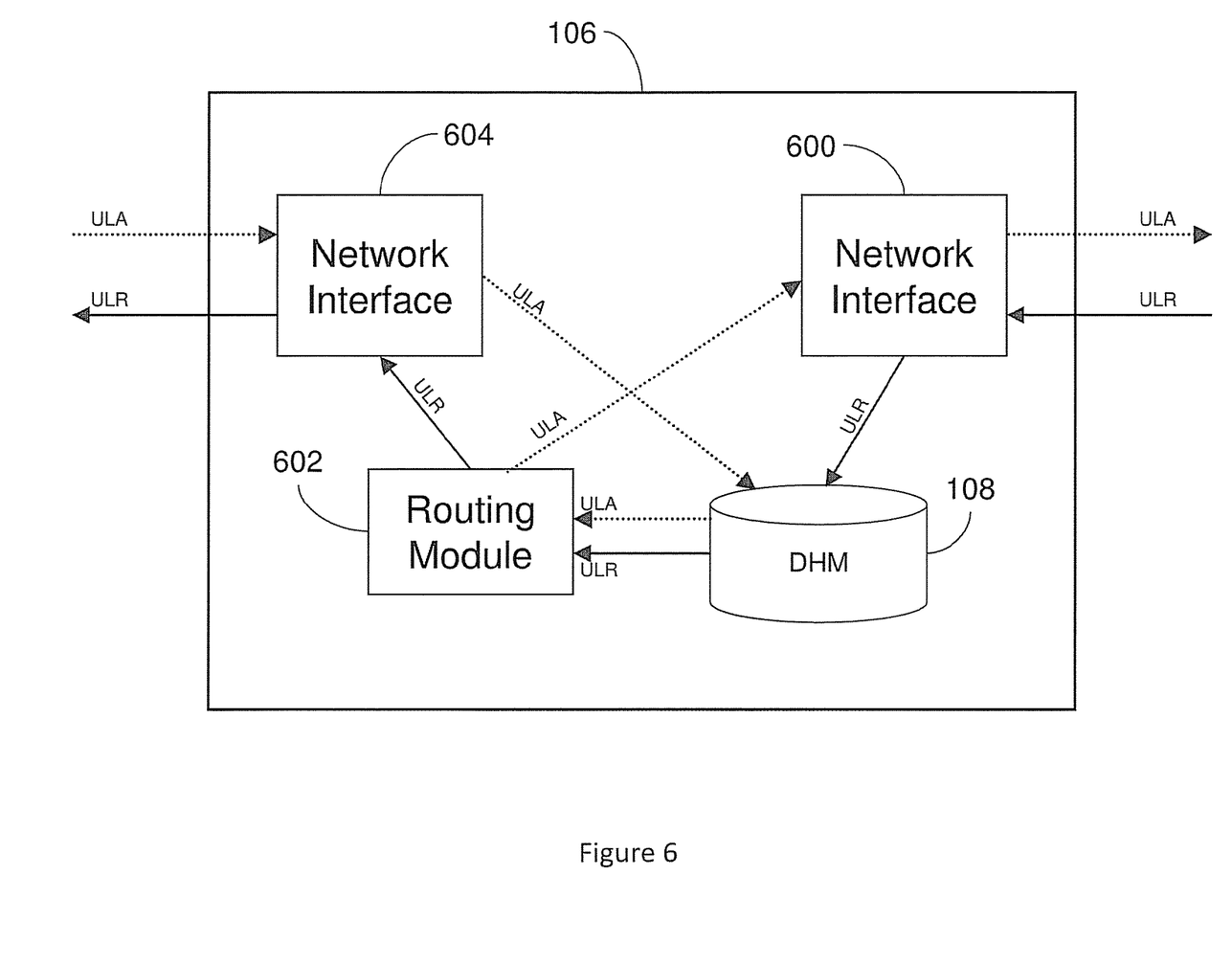
FIG. 6 is a block diagram illustrating an exemplary DIAMETER agent according to an embodiment of the subject matter described herein.

FIG. 6 is a block diagram illustrating an exemplary DIAMETER agent according to an embodiment of the subject matter described herein. A DIAMETER agent, such as DIAMETER agent 106, includes one or more network interfaces, such as network interfaces 600 and 604, a routing module 602, and a DIAMETER information hiding module 108 for implementing a topology hiding function. It will be understood that DIAMETER agent 106 may comprise additional components and is not limited to only the components shown in FIG. 6.

In one embodiment, DIAMETER agent 106 receives a message, such as a DIAMETER Update Location Request (ULR) message, at a network interface such as network interface 600. The message is passed to the topology hiding module 108, which then determines if the message needs to be modified before being routed to its destination. In this example, the URL message is not modified, and it is then passed to routing module 602. Routing module 602 determines the appropriate destination of the message and routes it through a network interface such as network interface 604.

DIAMETER agent 106 also receives a response message, such as a DIAMETER Update Location Answer (ULA) message, at a network interface 604. The ULA is passed to DIAMETER information hiding module 108, which then determines the message needs to be modified to obscure the identity of the origin host. DHM 108 modifies the message accordingly and passes the modified ULA message to routing module 602. Routing module 602 then routes the message to its destination via network interface 600.

Although DIAMETER information hiding module 108 and routing module 602 are shown here as distinct components of DIAMETER agent 106, DIAMETER information hiding module 108 and routing module may be integrated within the same chip or executed by the same processor.

DIAMETER agent 106 may be any suitable node capable of receiving and forwarding DIAMETER signaling messages. In one embodiment, DIAMETER agent 106 may be a DIAMETER signaling router that routes DIAMETER signaling messages based on DIAMETER information contained within the signaling messages. DIAMETER agent 106 may be, in addition to or instead of a DIAMETER signaling router, one or more of: a DIAMETER relay agent, a DIAMETER proxy agent, a DIAMETER redirect agent, or a DIAMETER translation agent, as described in IETF RFC 3588, the disclosure of which is incorporated herein by reference in its entirety.

Figure 7:
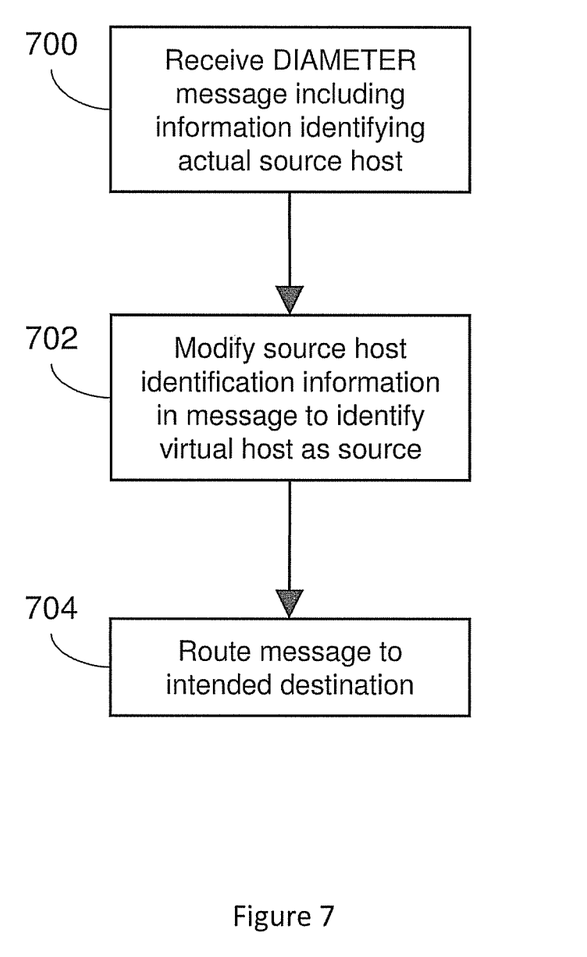
FIG. 7 is a flow chart illustrating an exemplary process for obscuring the identity of a DIAMETER node in a communication network according to an embodiment of the subject matter described herein.

FIG. 7 is a flow chart illustrating an exemplary process for obscuring the identity of a DIAMETER node in a communication network according to an embodiment of the subject matter described herein. In step 700, a DIAMETER agent having a topology hiding module 108, such as DIAMETER agent 106, receives a message at a network interface, such as network interface 604, including information identifying the node on its network from which the message originated. In step 702, DIAMETER agent 106, using DHM 108, modifies the identification information in the message, i.e. changes the "Origin-Host=" field in the message. In step 704, DIAMETER agent 106 routes the message to its intended destination, using routing module 602.

Figure 8A:
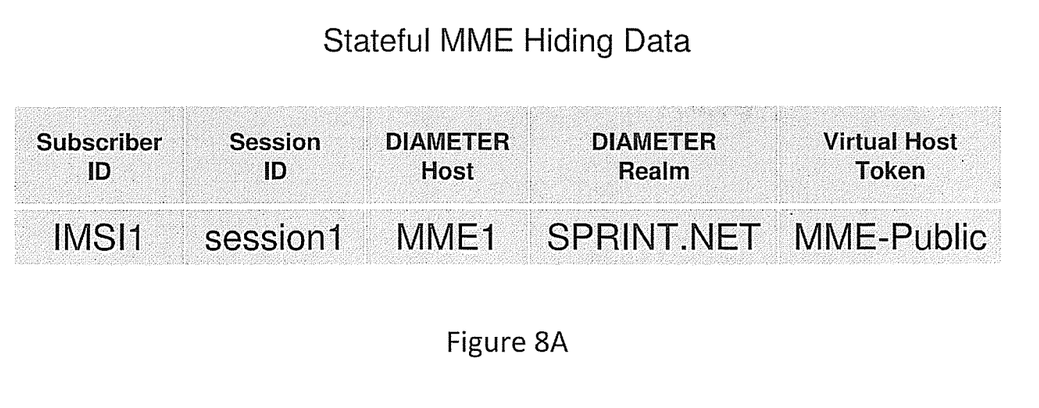
FIG. 8A is a table containing exemplary stateful topology hiding data according to an embodiment of the subject matter described herein.

FIG. 8A is a table containing exemplary stateful topology hiding data according to an embodiment of the subject matter described herein. As described above, a DIAMETER agent, such as DIAMETER agent 106, may maintain state information for messages routed through it or by it, in either direction. State information may include a session ID, may be maintained via reference to a subscriber's IMSI, or may be tracked through one of the many state-tracking mechanisms well known in the art. DIAMETER agent 106 may use this state information to resolve the appropriate destination node of additional communications involving the same subscriber, should they occur.

Figure 8B:
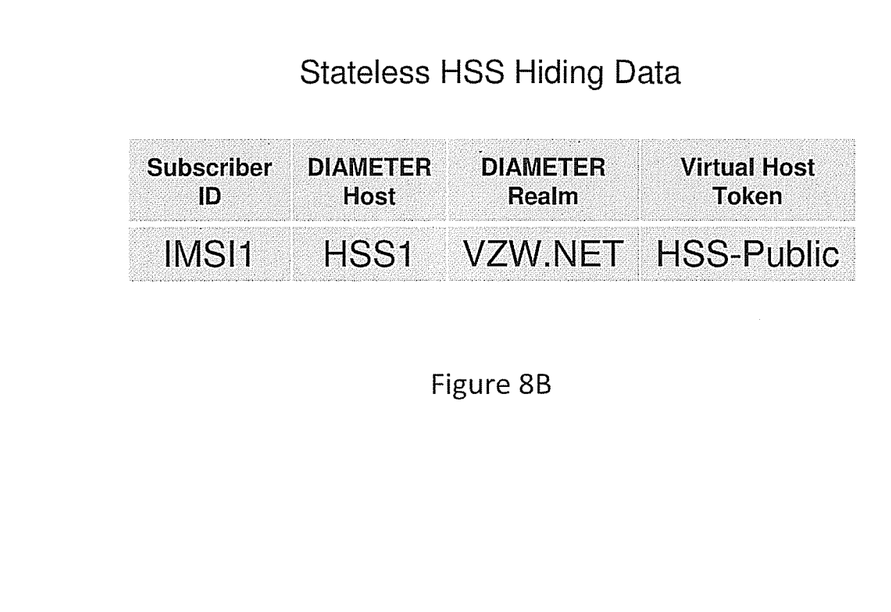
FIG. 8B is a table containing exemplary stateless topology hiding data according to an embodiment of the subject matter described herein.

A stateful implementation of the subject matter disclosed herein may include maintaining mapping information, as illustrated by the MME Hiding Data table in FIG. 8A, which maps the association between a subscriber, e.g. "IMSI1", a session, e.g. "session1", the DIAMETER host serving that subscriber, e.g. "MME1", the DIAMETER realm, e.g. "SPRINT.NET", and the virtual host identity, e.g. "MME-Public". A DIAMETER agent 106 configured to obscure the topology of networks including elements such as MMEs will generally store state information, i.e. the relationship between a subscriber, an MME and a virtual host, that is generated dynamically. FIG. 8B is a table containing exemplary stateless topology hiding data according to an embodiment of the subject matter described herein. As described above, a DIAMETER agent, such as DIAMETER agent 106, may identify a virtual host as the "Origin-Host" for messages coming from its network, so as to hide the true identity of the origin node or mask network topology information such as the number of elements deployed in the network. A stateless implementation of the subject matter disclosed herein may include maintaining mapping information, as illustrated by the HSS Hiding Data table in FIG. 8B, which maps the association between a subscriber, e.g. "IMSI1", the DIAMETER host serving that subscriber, e.g. "HSS1", the DIAMETER realm, e.g. "VZW.NET", and the virtual host identity, e.g. "HSS-Public". A DIAMETER agent 106 configured to obscure the topology of networks including elements such as HSSs will generally not store dynamically-created state information, as network elements such as HSSs are statically mapped, i.e. the same HSS will essentially always be the host that serves a particular subscriber. Therefore, given the relationship between a subscriber, an HSS and a virtual host essentially does not change, DIAMETER agent 106 may not need to track and store transaction information such as a session ID to accurately map a subscriber ID to an HSS and virtual host identity.

It will be understood that various details of the subject matter described herein may be changed without departing from the scope of the subject matter described herein. Furthermore, the foregoing description is for the purpose of illustration only, and not for the purpose of limitation.

What is claimed is:

1. A system for obscuring DIAMETER node information in a communication network, the system comprising:
   a DIAMETER agent platform, comprising:
   a processor;
   a network interface for receiving a message from a first DIAMETER node; and
   a memory that stores instructions, wherein the processor, in communication with the memory executes the instructions of the DIAMETER agent platform to perform the steps of:
   a DIAMETER information hiding module, stored in the memory, for modifying, in the message, DIAMETER information for the first DIAMETER node so as to obscure the identity of the first DIAMETER node, wherein the DIAMETER information identifies the first DIAMETER node as an originating host; and
   a routing module, stored in the memory, for routing the modified message to a second DIAMETER node, wherein the DIAMETER agent platform is configured to replace, in the message, the DIAMETER information identifying the DIAMETER node with a single virtual DIAMETER identity, wherein the DIAMETER agent platform comprises a DIAMETER signaling router that routes received DIAMETER signaling messages based on DIAMETER information contained within the DIAMETER signaling messages, wherein the DIAMETER signaling router hides DIAMETER network topology by assigning the single virtual DIAMETER identity to a plurality of different DIAMETER nodes, and wherein the DIAMETER signaling router maintains a session-stateless mapping between a subscriber identifier, the DIAMETER information for the first DIAMETER node, and the virtual DIAMETER identification information,
   wherein the single virtual DIAMETER identity identifies the message as originating from a virtual DIAMETER node, and
   wherein the DIAMETER agent platform receives DIAMETER messages addressed to the single virtual DIAMETER identity and changes a destination address in at least some of the messages to an address of the first DIAMETER node using the session-stateless mapping.

2. The system of claim 1 wherein the first DIAMETER node is one of a home subscriber server (HSS) and a mobility management entity (MME).

3. The system of claim 1 wherein the second DIAMETER node is one of a mobility management entity (MME), a home subscriber server (HSS), a policy and charging rules function (PCRF), an online charging system (OCS), and an offline charging system (OFCS).

4. The system of claim 1 wherein the DIAMETER message includes one of an UpdateLocation Request (ULR) message, an UpdateLocation Answer (ULA) message, a CancelLocation Request (CLR) message, a CancelLocation Answer (CLA) message, Credit-Control-Request (CCR) message, Credit-Control-Answer (CCA) message, Accounting-Request (ACR) message, Accounting-Answer (ACA) message, Re-Auth-Request (RAR) message, and a Re-Auth-Answer (RAA) message.

5. The system of claim 1 wherein the DIAMETER agent platform maintains state information associated with a transaction involving the received message.

6. The system of claim 1 wherein the DIAMETER agent platform is stateless with regard to a transaction involving the received message.

7. The system of claim 1 wherein the DIAMETER agent platform comprises one or more of:
   a DIAMETER relay agent, a DIAMETER proxy agent, a DIAMETER redirect agent, and a DIAMETER translation agent.

8. A method for obscuring DIAMETER node information in a communication network, the method comprising:
   in a DIAMETER agent platform, comprising a processor, a network interface that receives a message from a first DIAMETER node, and a memory that stores instructions, wherein the processor, in communication with the memory executes the instructions of the DIAMETER agent platform to perform the steps of:
   modifying, by a DIAMETER hiding module stored in the memory, DIAMETER identifying information in the message received from the first DIAMETER node so as to obscure the identity of the first DIAMETER node, wherein the DIAMETER identifying information identifies the first DIAMETER node as an originating host; and
   routing, by a routing module stored in the memory, the modified message to a second DIAMETER node, wherein the DIAMETER agent platform is configured to replace, in the message, the DIAMETER information identifying the first DIAMETER node with a single virtual DIAMETER identity, wherein the DIAMETER agent platform comprises a DIAMETER signaling router that routes received DIAMETER signaling messages based on DIAMETER information contained within the DIAMETER signaling messages, wherein the DIAMETER signaling router hides DIAMETER network topology by assigning the single virtual DIAMETER identity to a plurality of different DIAMETER nodes, and wherein the DIAMETER signaling router maintains a session-stateless mapping between a subscriber identifier, the DIAMETER information for the first DIAMETER node, and the virtual DIAMETER identification information,
   wherein the single virtual DIAMETER identity identifies the message as originating from a virtual DIAMETER node, and
   wherein the DIAMETER agent platform receives DIAMETER messages addressed to the single virtual DIAMETER identity and changes a destination address in at least some of the messages to an address of the first DIAMETER node using the session-stateless mapping.

9. The method of claim 8 wherein the first DIAMETER node is one of a home subscriber server (HSS) and a mobility management entity (MME).

10. The method of claim 8 wherein the second DIAMETER node is one of a mobility management entity (MME), a home subscriber server (HSS), a policy and charging rules function (PCRF), an online charging system (OCS), and an offline charging system (OFCS).

11. The method of claim 8 wherein the DIAMETER message includes one of an UpdateLocation Request (ULR) message, an UpdateLocation Answer (ULA) message, a CancelLocation Request (CLR) message, a CancelLocation Answer (CLA) message, Credit-Control-Request (CCR) message, Credit-Control-Answer (CCA) message, Accounting-Request (ACR) message, Accounting-Answer (ACA) message, Re-Auth-Request (RAR) message, and a Re-Auth-Answer (RAA) message.

12. The method of claim 8 wherein the DIAMETER agent platform maintains state information associated with a transaction involving the received message and uses the state information to deliver the message to the second DIAMETER node.

13. The method of claim 8 wherein the DIAMETER agent platform is stateless with regard to a transaction involving the received message.

14. The method of claim 8 wherein the DIAMETER agent platform comprises one or more of:
a DIAMETER relay agent, a DIAMETER proxy agent, a DIAMETER redirect agent, and a DIAMETER translation agent.

15. A non-transitory computer readable medium having stored thereon executable instructions that when executed by the processor of a computer control the computer to perform steps comprising:
in a DIAMETER agent platform, comprising a processor, a network interface that receives a message from a first DIAMETER node, and a memory that stores instructions, wherein the processor, in communication with the memory executes the instructions of the DIAMETER agent platform to perform the steps of:
modifying, by a DIAMETER hiding module stored in the memory, DIAMETER identifying information in the message received from the first DIAMETER node so as to obscure the identity of the first DIAMETER node, wherein the DIAMETER identifying information identifies the first DIAMETER node as an originating host; and
routing, by a routing module stored in the memory, the modified message to a second DIAMETER node, wherein the DIAMETER agent platform is configured to replace, in the message, the DIAMETER information identifying the first DIAMETER node with a single virtual DIAMETER identity, wherein the DIAMETER agent platform comprises a DIAMETER signaling router that routes received DIAMETER signaling messages based on DIAMETER information contained within the DIAMETER signaling messages, wherein the DIAMETER signaling router hides DIAMETER network topology by assigning the single virtual DIAMETER identity to a plurality of different DIAMETER nodes, and wherein the DIAMETER signaling router maintains a session-stateless mapping between a subscriber identifier, the DIAMETER information for the first DIAMETER node, and the virtual DIAMETER identification information,
wherein the single virtual DIAMETER identity identifies the message as originating from a virtual DIAMETER node, and
wherein the DIAMETER agent platform receives DIAMETER messages addressed to the single virtual DIAMETER identity and changes a destination address in at least some of the messages to an address of the first DIAMETER node using the session-stateless mapping.

\* \* \* \* \*